F. V. ROSS.
GASOLINE CLARIFIER AND PURIFIER.
APPLICATION FILED MAY 8, 1922.
1,437,153.
Patented Nov. 28, 1922.
2 SHEETS—SHEET 1.
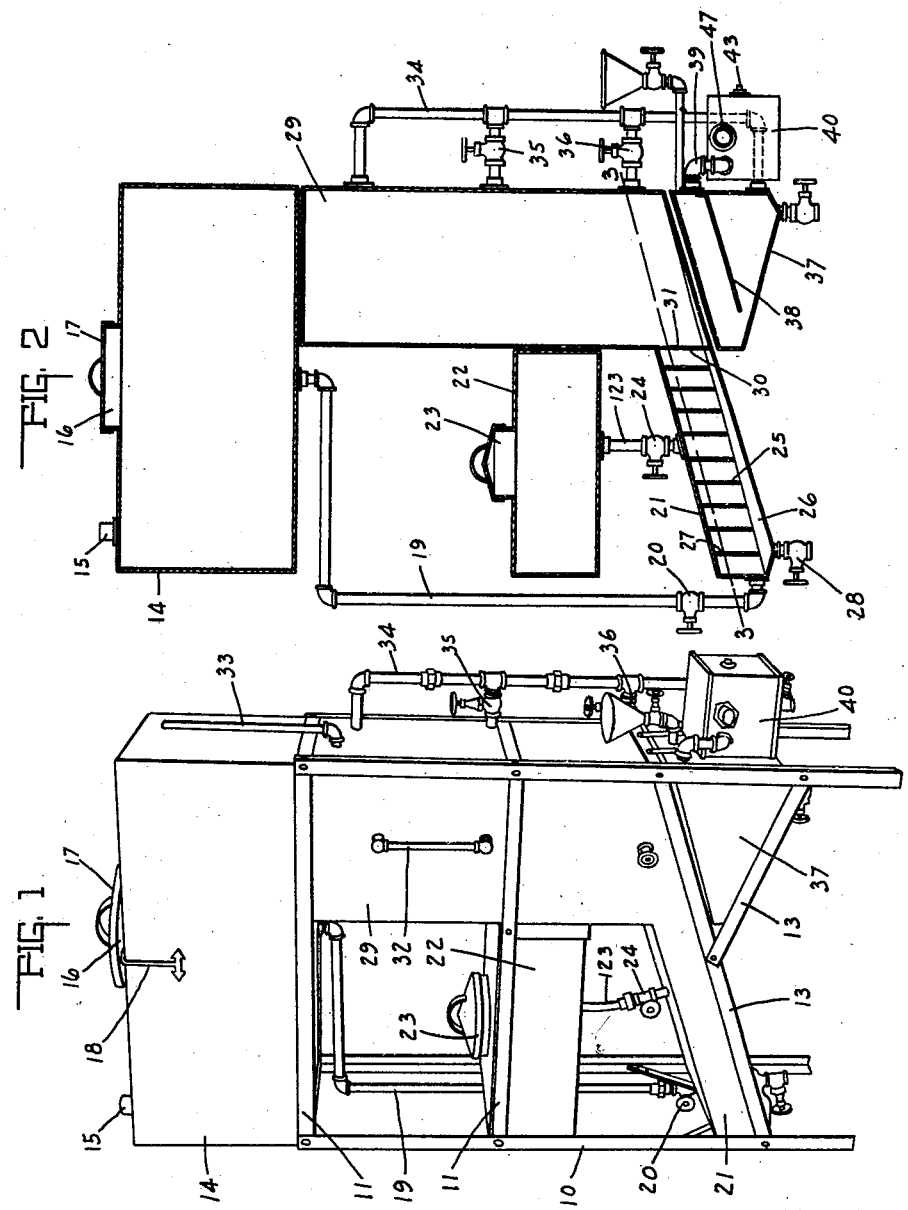
INVENTOR.
FRANK V. ROSS.
BY
ATTORNEYS.

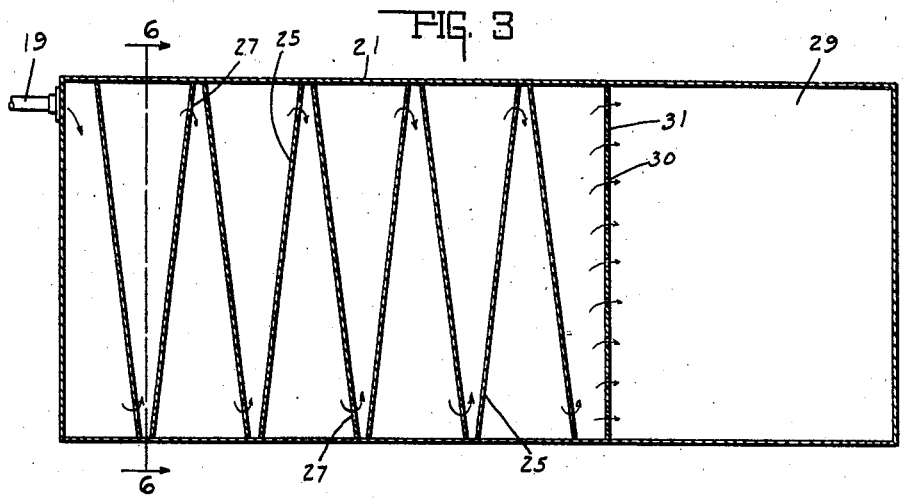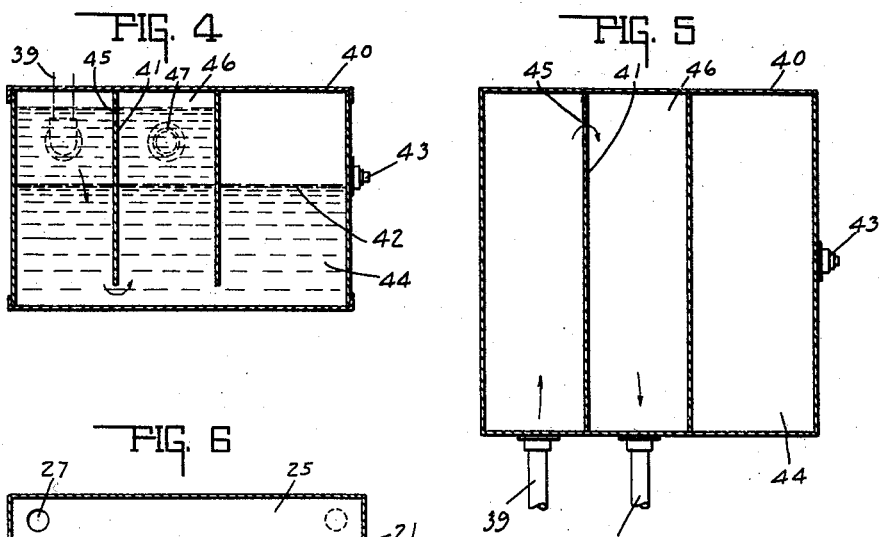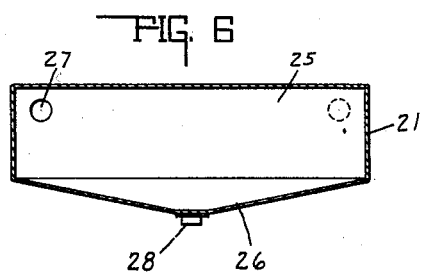

Patented Nov. 28, 1922.

1,437,153

UNITED STATES PATENT OFFICE.

FRANK V. ROSS, OF INDIANAPOLIS, INDIANA, ASSIGNOR TO F. M. BOWERS AND SON COMPANY, OF INDIANAPOLIS, INDIANA, A CORPORATION.

GASOLINE CLARIFIER AND PURIFIER.

Application filed May 8, 1922. Serial No. 559,195.

*To all whom it may concern:*

Be it known that I, FRANK V. Ross, a citizen of the United States, and a resident of Indianapolis, county of Marion, and State of Indiana, have invented a certain new and useful Gasoline Clarifier and Purifier; and I do hereby declare that the following is a full, clear, and exact description thereof, reference being had to the accompanying drawings, in which like numerals refer to like parts.

This invention relates to a machine for clarifying and purifying gasoline used in the cleaning of garments, whereby the used gasoline may be clarified and purified by running the same through said machine to be reclaimed for use.

The main feature of the invention lies in the arrangement and combination of parts, whereby a simple and compact machine is obtained, and more particularly to the arrangement of the filter chamber and baffle plates contained therein for filtering the gasoline as it passes through the machine.

Still another feature of the invention resides in the means for rinsing the gasoline by passing the same through water and the separating tank for separating the water therefrom.

The full nature of the invention will be understood from the accompanying drawings and the following description and claims.

In the drawings Fig. 1 is a perspective view of the assembly of the machine. Fig. 2 is a central vertical section taken through the various tanks and compartments of the machine, arranged diagrammatically in their relative positions. Fig. 3 is a section taken on the line 3—3 of Fig. 2. Fig. 4 is a central vertical section through the separator tank. Fig. 5 is a horizontal section through the separator tank. Fig. 6 is a section taken on the line 6—6 of Fig. 3.

In the drawings there is shown a gasoline clarifier and purifier comprising an angle iron supporting frame provided with standards 10, cross pieces 11 and angularly disposed cross pieces 13. Mounted on the top of said frame, there is a supply or delivery tank 14 into which gasoline which has been used for cleansing garments or the like is pumped through the inlet 15. Said tank is provided with a top opening 16 which is closed by a cover 17, and contains an indicator 18 secured to a float within said tank for indicating the level of the liquid therein. The gasoline passes from said delivery tank through a pipe 19 and the control valve 20 to the bottom of the end of the inclined filter chamber 21.

Mounted above the filter chamber 21, there is a mixing tank 22 having an opening with a lid 23 in which the caustic soda filtering solution is contained. The solution passes through the pipe 123 from the bottom of said tank, and the valve 24 to the filter chamber 21, so that said chamber is constantly filled with a caustic soda solution. The filtering chamber is provided with a plurality of baffle plates 25 which extend transversely thereof at an angle, as shown in Fig. 3. Said baffle plates extend from the top of said chamber to the bottom edge thereof, but are spaced from the bottom of the sump 26, as shown in Fig. 6. The baffle plates 25 are arranged so that adjacent plates are disposed at an angle to each other, as shown in Fig. 3, and are provided near their upper edge with a single port 27 through which the gasoline may pass. This arrangement causes the gasoline to pass through the caustic soda contained therein for an appreciable distance, since it must go back and forth across the chamber in order to pass through said plates, as indicated by the arrows in Fig. 6. The sump portion 26 is free of obstruction to permit the sediment filtered and precipitated from the gasoline to freely pass down to the drain-cock 28. Inasmuch as the purification of the gasoline is increased in proportion to the distance of its travel through the caustic soda solution, the tank 21 has been arranged to cause the gasoline to travel at a maximum distance therethrough.

After the gasoline has passed through the filter chamber, it enters the settling tank 29 through a plurality of ports 30 opening through the wall 31, separating said settling tank from said filter chamber. As the gasoline slowly rises in said tank, it precipitates the foreign matter or impurities which have been separated therefrom in the filter chamber, which impurities fall to the bottom and settle in the sump 26. The upper portion of the settling tank is provided with the usual gage 32 and air vent 33. The upper portion thereof is connected with the discharge pipe 34 which also has a connection 35 midway of its ends and a connection 36 at the bottom, so that the top portion of the purified gasoline may be drawn off at varying levels.

The purified gasoline drawn from the top portion of the settling tank and passing through the pipe 34 enters the lower portion of the water rinsing chamber 37 which is maintained substantially half full of water through which the gasoline must pass and be washed. In said chamber there is provided a baffle plate 38 about which the gasoline must pass and flow the length of said chamber and back again.

After the gasoline has been thoroughly washed, it is taken off through the pipe 39 which connects with the water separating tank 40, said tank being provided with a plurality of partitions 41 extending vertically and longitudinally thereof, as shown in Figs. 4 and 5. The water level 42 is maintained substantially at a level of the water drain 43, and any water contained in the gasoline after passing through the water rinsing chamber 37 will precipitate in the separating tank passing under the partitions 41, as shown by the arrow in Fig. 4, into the compartment 44. The gasoline will then pass through the port 45 in the upper portion of one of the partitions 41, passing into the compartment 46 and out through the pipe 47 to the underground storage tank to be reused.

The invention claim is:

1. In a gasoline purifier and clarifier, the combination with a supporting frame, and a delivery tank, of an inclined filter chamber mounted at the bottom thereof, an inlet pipe connected with the lower end of said filter chamber, a vertically extending settling tank mounted with the bottom end adjacent the upper end of said filter chamber and having its top below the bottom of said delivery tank, and means for drawing gasoline therefrom for reuse in garment cleaning.

2. In a gasoline purifier and clarifier, the combination with a supporting frame, and a delivery tank, of an inclined filter chamber mounted at the bottom thereof, an inlet pipe connected with the lower end of said filter chamber, a vertically extending settling tank mounted with the bottom end adjacent the upper end of said filter chamber and having its top below the bottom of said delivery tank, and a water rinsing chamber below said settling tank into which the gasoline is discharged, said tank being provided with a baffle plate about which the gasoline passes before being discharged therefrom.

3. In a gasoline purifier and clarifier, the combination with a supporting frame, and a delivery tank, of an inclined filter chamber mounted at the bottom thereof, an inlet pipe connected with the lower end of said filter chamber, a vertically extending settling tank mounted with the bottom end adjacent the upper end of said filter chamber and having its top below the bottom of said delivery tank, a water rinsing chamber below said settling tank into which the gasoline is discharged, said tank being provided with a baffle plate about which the gasoline passes before being discharged therefrom, and a water separating tank adjacent to said rinsing chamber into which the gasoline passes therefrom for separating any water carried by said gasoline therefrom, substantially as described.

In witness whereof, I have hereunto affixed my signature.

FRANK V. ROSS.